United States Patent Office 3,468,906
Patented Sept. 23, 1969

3,468,906
1,1-DIPHENYL-1-LOWER ALKANOYLOXY AND CARBOLOWER ALKOXY ALKENAMINES
Adrian Marxer, Muttenz, Switzerland, assignor to Ciba Corporation, New York, N.Y., a corporation of Delaware
No Drawing. Filed Mar. 28, 1966, Ser. No. 537,710
Claims priority, application Switzerland, Apr. 15, 1965, 5,305/65, 5,306/65; Feb. 24, 1966, 2,693/66, 2,694/66
Int. Cl. C07d 87/36, 51/72; C07c 93/22
U.S. Cl. 260—326.3        11 Claims

ABSTRACT OF THE DISCLOSURE

Amino-esters of the formula

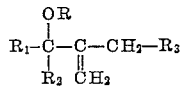

in which R represents an acyl radical, $R_1$ and $R_2$ an aryl radical each, and $R_3$ an aliphatic tertiary amino group, and their salts. The compounds are useful as analgesics or as cardiovascular agents.

---

The present invention provides new unsaturated amines. Especially it concerns amino-esters of the formula

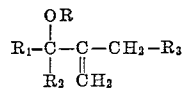

in which R represents an acyl radical, $R_1$ and $R_2$ an aryl radical each, and $R_3$ an aliphatic tertiary amino group, and their salts.

Suitable acyl radicals are primarily lower alkanoyl radicals such as acetyl, propionyl or butyryl residues or lower carbalkoxy radicals such as carbopropoxy, carbethoxy or carbomethoxy radicals.

Aryl radicals are above all phenyl groups which may be unsubstituted or contain one, two or several substituents, for example, lower alkyls, such as methyl, ethyl, propyl or isopropyl groups, or linear or branched butyl residues bound in any desired position, lower alkoxy groups, especially methoxy, ethoxy, propoxy or butoxy groups, or halogen atoms, above all fluorine, chlorine or bromine atoms or the trifluoromethyl group.

A suitable aliphatic tertiary amino group is an amino group substituted by a bivalent residue or two monovalent residues of aliphatic nature. Substituents of the amino group are above all alkyl radicals, such as lower alkyl radicals e.g. those mentioned above, or linear or branched alkylene radicals, e.g., butylene-(1,4)- pentylene-(1,5), 1,5-dimethyl-pentylene-(1,5), hexylene-(1,6), hexylene-(1,5) or mono-oxa-, mono-aza- or mono-thia-alkylene residues, especially those comprising, together with the nitrogen atom, up to 8 cyclic members, e.g., 3-oxa- or 3-thia-pentylene-(1,5), 3-methyl-3-aza-hexylene-(1,6), 3-ethyl-1,5-dimethyl-3-aza-pentylene-(1,5) or 3-methyl-3-aza-pentylene-(1,5).

The tertiary aliphatic amino group is in the first place a pyrrolidino, piperidino, morpholino, thiamorpholino or N′-lower alkyl-piperazino group such as the N′-methyl-piperazino group, or above all a di-lower alkyl-amino group such as the diethylamino or better still the dimethylamino group.

The new compounds possess valuable pharmacological properties, for example an analgesic and a coronary dilatating action, as has been shown by animal experiments, e.g., on the mouse and the rat and cat, respectively. Moreover, they act as morphine antagonists. They may therefore be used as analgesics or as cardiovascular agents.

The new compounds are also suitable for use as starting or intermediate products for the manufacture of other valuable substances.

Especially valuable are the compounds of the formula

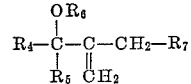

in which $R_4$ and $R_5$ are phenyl groups which may be unsubstituted or substituted, for example as indicated above, $R_6$ represents a lower alkanoyl residue and $R_7$ a piperidino, N-lower alkyl-piperazino, morpholino or pyrrolidino group or above all a di-lower alkyl-amino group such as the diethylamino or more especially the dimethylamino group, and more especially the compounds of the formula

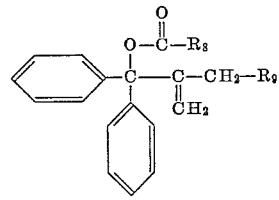

in which $R_8$ represents the methyl or ethyl group and $R_9$ the dimethylamino or pyrrolidino group, and above all 1,1-diphenyl - 1 - propionyloxy - 2 - (dimethylaminomethyl)-2-propene.

The new compounds are manufactured by known methods. For example, a compound of the formula

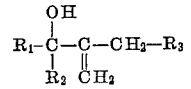

in which $R_1$, $R_2$ and $R_3$ have the above meanings, is acylated.

The acylation can be performed, e.g., by reaction with a halide, such as the chloride, of the desired acid or especially with an anhydride of the desired acid, e.g., an inner anhydride such as a ketene, or the ordinary anhydride.

Depending on the reaction conditions and starting materials used the final products are obtained in the free form or in the form of their salts which are likewise included in this invention. The salts of the final products can be converted into the free bases in known manner, e.g., with alkalies or ion exchange resins. When the free bases are reacted with organic or inorganic acids, especially acids that form therapeutically useful salts, they yield salts. As such acids there may be mentioned, for example, the hydrohalic, sulphuric, phosphoric acids or nitric acid; aliphatic, alicyclic, aromatic or heterocyclic carboxylic or silphonic acids such as formic, acetic, propionic, succinic, glycollic, lactic, malic, tartaric, citric, ascorbic, maleic, hydroxymaleic, pyruvic or laevulic acid; phenylacetic, benzoic, para-aminobenzoic, anthranilic, para-hydroxybenzoic, salicylic or para-aminosalicylic acid, methanesulphonic, ethanesulphonic, hydroxyethanesulphonic or ethylenesulphonic acid; halogenbenzenesulphonic, toluenesulphonic, naphthalenesulphonic or sulphanilic acid.

These or other salts of the new compounds, e.g., their picrates, may also be used for purifying the resulting free bases by converting the latter into salts, isolating the salts and liberating the bases again from them. In view of the close relationship between the new compounds in the free form and in the form of their salts what has been said above and below with reference to the free bases concerns also the corresponding salts wherever this is possible and useful.

The invention further includes any variant of the process in which an intermediate obtainable at any stage of the process is used as starting material and any remaining steps are carried out, or in which a starting material is formed in situ or a reactant is used in the form of a salt.

For example, the hydroxyl compound to be acylated may be used in the form of its O-salts, such as the O-metal salts, for example of the O-alkali metal salts, such as the sodium or potassium salts or of the O-magnesium halide salts, such as the magnesium bromide salts, as formed, for example in the Grignard reaction performed to make the starting material, that is to say, the complex obtained from the Grignard reaction can be reacted as it is with the acylating agent.

The reactions of this invention are advantageously performed with starting materials that give rise to the compounds specifically mentioned above.

The aminoalcohols of the formula

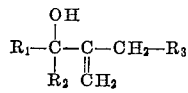

used as starting materials may be prepared for example by reacting a ketone of the formula

in which $R_1$ and $R_2$ have the meanings given above, with a compound of the formula

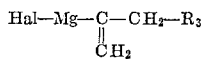

in which $R_3$ has the meaning given above and Hal represents chlorine or preferably bromine, and, if desired, decomposing the resulting complex.

The reaction is carried out in a known manner, preferably in the presence of a solvent or diluent, for example an ether, such as tetrahydrofuran. The decomposition of the resulting complex is carried out in the customary manner, for example by hydrolysis.

The aminoalcohols of the formula

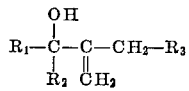

in which $R_1$ and $R_2$ each is an aryl radical and $R_3$ represents an aliphatic tertiary amino group in which, when $R_1$ and $R_2$ represent unsubstituted phenyl radicals, at most one of the substitutents is an ethyl group, and their salts are new and have also valuable pharmacological properties, above all an analgesic and diuretic effect as has been demonstrated by animal experiments, e.g., on the mouse and on the rat. In addition, they act as morphine-antagonists. The new compounds may thus be used as analgesics and diuretics. These aminoalcohols are therefore a further embodiment of the present invention.

Aryl radicals $R_1$ and $R_2$ and aliphatic tertiary amino groups $R_3$ are preferably those described above for the amino-esters.

Above all, there should be mentioned compounds of the formula

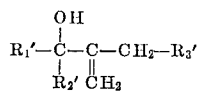

in which $R_1'$ is an aryl, e.g. phenyl group, which may be unsubstituted or e.g. substituted as indicated above; $R_2'$ represents a substituted aryl, e.g., phenyl group and $R_3'$ an aliphatic tertiary amino group, above all a piperidino, N-lower alkyl-piperazino, morpholino or pyrrolidino group or above all a di-lower alkyl-amino group such as the diethylamino or more especially the dimethylamino group.

Special mention deserve the compounds of the formula

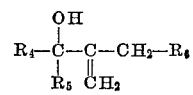

in which $R_4$ and $R_5$ each represents an unsubstituted aryl group, especially an unsubstituted phenyl group, and $R_6$ represents an alkylene-imino group, an oxa-, aza- or thia-alkylene-imino group, e.g., one of those mentioned above, or a di-lower alkyl-amino group in which one of the lower alkyl groups contains at least 3 carbon atoms; or compounds of the above formula where $R_4$ and $R_5$ have the above meanings and $R_6$ stands for a di-alkyl-amino group in which the two alkyl groups together contain a total of up to 3 carbon atoms.

Particularly valuable analgesics are the compounds of the formula

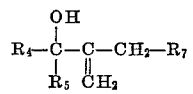

in which $R_4$ and $R_5$ have the above meanings, and $R_7$ represents a piperidino, N-lower alkyl-piperazino, morpholino or pyrrolidino group or above all a di-lower alkyl-amino group in which one of the lower alkyl groups contains at least 3 carbon atoms, or more especially the dimethylamino group, and in the first place the compounds of the formula

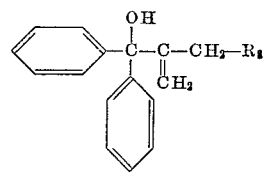

in which $R_8$ represents the dimethylamino or pyrrolidino group, and above all 1,1-diphenyl-2-(dimethylamino-methyl)-2-propen-1-ol.

Depending on the reaction conditions and starting materials used the amino alcohols are obtained in the free form or in the form of their salts which are likewise included in this invention. The salts of the final products can be converted into the free bases in a known manner, e.g., with alkalies or ion exchange resins. When the free bases are reacted with organic or inorganic acids, especially those mentioned above they yield salts.

In the same manner as mentioned above the salts of the amino-alcohols may be used for purifying the amino-alcohols.

The other starting materials are known or can be prepared by known methods.

When compounds (amino-esters or amino-alcohols) in which $R_1$ and $R_2$ are different from each other, are obtained in the form of racemates, they can be resolved into the optical antipodes by known methods, for example thus: The racemic bases, dissolved in a suitable inert solvent, are reacted with an optically active acid and the resulting salts are separated—e.g. by way of their different solubilities—into the diastereomers from which the antipodes of the new bases can be liberated by treatment with an alkaline agent. Particularly frequently used optically active acids are the D- and L-forms of tartaric acid, diortho-toluyltartaric acid, malic acid, mandelic, camphorsulphonic or quinic acid. Alternatively, the separation may be carried out, for example, by recrystallizing the resulting pure racemate from an optically active solvent. It is advantageous to isolate the more actitive of the two antipodes.

The new compounds may be used, e.g., in the form of pharmaceutical preparations which contain them in the free form or in the form of their salts in admixture or conjunction with an organic or inorganic, solid or liquid pharmaceutical excipient suitable for enteral, parenteral or topical administration. Suitable excipients are substances that do not react with the new compounds, e.g., water, gelatin, lactose, starches, stearyl alcohol, magnesium stearate, talcum, vegetable oils, benzyl alcohols, gums, propylene glycols, white petroleum jelly or other known medicinal excipients. The pharmaceutical preparations may be, for example, tablets, dragees, capsules, suppositories, ointments, creams, or in liquid form solutions, suspensions or emulsions. They may be sterilized and/or contain assistants such as preserving, stabilizing, wetting or emulsifying agents, solution promoters, salts for regulating the osmotic pressure or buffers. They may also contain further therapeutically valuable substances. The pharmaceutical preparations are formulated by the usual methods.

The following examples illustrate the invention.

EXAMPLE 1

7.2 g. of magnesium (0.3 mol) are etched in a stirring flask with a small amount of iodine, and 20 ml. of absolute tetrahydrofuran and 0.8 ml. of ethyl bromide are then added. The reaction is initiated by slight heating, and in the course of 15 to 20 minutes 49.2 g. (0.3 mol) of N,N-dimethyl-2-bromallylamine in 50 ml. of absolute tetrahydrofuran are dropped in at a rate such that the solution keeps boiling, whereupon it is boiled for another 30 minutes until substantially all of the magnesium has dissolved. Without cooling, 39.2 g. (0.2 mol) of benzophenone in 125 ml. of absolute tetrahydrofuran are then dropped in at a rate such that the reaction solution keeps boiling. It is then refluxed for 6 hours, poured into 60 g. of ammonium chloride in ½ liter of water, the precipitated oil is extracted with ether, the extract is washed with water, repeatedly extracted with 2 N-acetic acid (total 450 ml.) and rendered alkaline with 125 ml. of 10 N-sodium hydroxide solution; the precipitated oil is taken up in ether and from it 1,1-diphenyl-2-(dimethylaminomethyl)-2-propen-1-ol of the formula

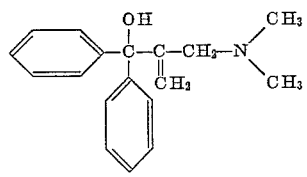

is isolated. The base crystallizes and melts at 83° C. in the form of the crude crystallizate. When it is dissolved in ethyl acetate and alcoholic hydrochloric acid is added, it yields 1,1-diphenyl-2-(dimethylaminomethyl)-2-propen-1-ol hydrochloride melting at 203 to 204° C.

The N,N-dimethyl-2-bromallylamine (B.P. 63 to 64° C. under 76 to 79 mm. Hg pressure) used as starting material can be prepared by introducing 2 mols of dimethylamine into a benzolic solution of 2,3-dibromopropene while cooling with ice, followed by heating to 50° C.

EXAMPLE 2

7.2 g. of magnesium (0.3 mol) are etched in a stirring flask with iodine, and 20 ml. of absolute tetrahydrofuran and 0.8 ml. of ethylbromide are added. The reaction is initiated by slight heating. Within 20 minutes 49.2 g. (0.3 mol) of N,N-dimethyl-2-bromallylamine in 50 ml. of tetrahydrofuran are dropped in at a rate such that the solution keeps boiling. It is then boiled for another 30 minutes, a solution of 60.6 g. (0.25 mol) of 4,4'-dimethoxybenzophenone in 150 ml. of tetrahydrofuran is run in within 15 minutes; the batch is refluxed for 8 hours, poured into an aqueous ammonium chloride solution, taken up in ether, washed with water and extracted with 2 N-acetic acid (total ½ liter). The base is liberated with 10 N-sodium hydroxide solution, taken up in ether, and from it the 1,1-di-(para-methoxyphenyl)-2-(dimethylaminomethyl)-2-propen-1-ol of the formula

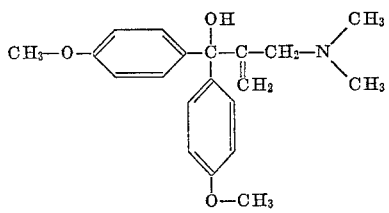

is isolated. The base crystallizes gradually and melts (in the crude form) at 90° C. Its hydrochloride is obtained by dissolving the base in ethyl acetate and adding alcoholic hydrochloric acid; the hydrochloride melts at 178 to 180° C.

EXAMPLE 3

7.2 g. of magnesium (0.3 mol) are etched in a stirring flask with iodine, and 20 ml. of absolute tetrahydrofuran and 0.8 ml. of ethyl bromide are added. The reaction is initiated by slight heating. Within 20 minutes 49.2 g. (0.3 mol) of N,N-dimethyl-2-bromallylamine in 50 ml. of tetrahydrofuran are dropped in at a rate such that the solution keeps boiling. The batch is kept boiling for another 30 minutes, within 15 minutes a solution of 54.1 g. (0.25 mol) of metachlorobenzophenone in 150 ml. of tetrahydrofuran is run in, the batch is refluxed for 8 hours, poured into aqueous ammonium chloride solution, taken up in ether, washed with water and extracted with 2 N-acetic acid (total ½ liter) and then with 100 ml. of 2 N-hydrochloric acid. The base is liberated with 10 N-sodium hydroxide solution, taken up in ether, and 1-phenyl-1-(meta-chlorophenyl)-2-(dimethylaminomethyl)-2-propen-1-ol of the formula

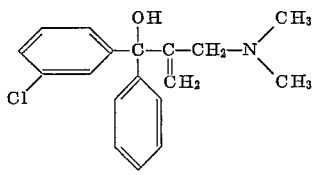

is isolated from it. The base solidifies and melts at 64 to 66° C. In ethyl acetate with alcoholic 2.5 N-hydrochloric acid it yields a hydrochloride melting at 220 to 221° C.

EXAMPLE 4

7.2 g. of magnesium (0.3 mol) in a flask equipped with a stirrer are etched with iodine and then treated with 20 ml. of absolute tetrahydrofuran and 0.8 ml. of ethyl bromide. The reaction is triggered off by slight heating. In the course of 20 minutes, 49.2 g. (0.3 mol) of N,N-dimethyl-2-bromallylamine in 50 ml. of tetrahydrofuran are dropped in in such manner that the solution keeps boiling. The batch is boiled for another 30 minutes and, after a solution of 54.1 g. (0.25 mol) of ortho-chlorobenzophenone in 150 ml. of tetrahydrofuran has been allowed to run in in the course of 15 minutes, refluxed for 8 hours, poured into an aqueous ammonium chloride solution, and dissolved in ether. The ethereal solution is washed with water and extracted with a total of 350 ml. of 2 N-hydrochloric acid. The base is liberated with 150 ml. of 10 N-sodium hydroxide solution, dissolved in ether, and from the ethereal solution the crude 1-phenyl-1(ortho-chlorophenyl)-2-(dimethylaminomethyl)-2-propen-1-ol of the formula

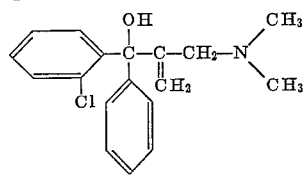

is isolated. Dissolution of the base is ethyl acetate and treating the solution with ethanolic 2.5 N-hydrochloric acid results in the 1-phenyl-1-(ortho-chlorophenyl)-2-(dimethylaminomethyl) - 2 - propen-1-ol hydrochloride melting at 209–210° C.

EXAMPLE 5

In a flask equipped with a stirrer, 7.2 g. of magnesium (0.3 mol) are etched with a small amount of iodine and treated with 20 ml. of absolute tertahydrofuran and 0.8 ml. of ethyl bromide. The reaction is triggered off by slight heating and, in the course of 15–20 minutes, 57.0 g. (0.3 mol) of N-(2-bromallyl)-pyrrolidine in 50 ml. of absolute tetrahydrofuran dropped in in such manner that the solution keeps boiling. The batch is heated at the boiling temperature for 30 minutes until all but traces of the magnesium has dissolved. Without cooling 39.2 g. (0.2 mol) of benzophenone in 125 ml. of absolute tetrahydrofuran are added dropwise in such manner that the solution keeps boiling. The batch is then refluxed for 6 hours, poured into 60 g. of ammonium chloride in 500 ml. of water, the precipitated oil is extracted with ether, the ethereal solution washed with water and extracted several times with a total of 350 ml. of 2 N-hydrochloric acid, the extract is rendered alkaline with 125 ml. of 10 N-sodium hydroxide solution, the precipitated oil dissolved in ether, and 1,1-diphenyl-2-(pyrrolidinomethyl)-2-propen-1-ol of the formula

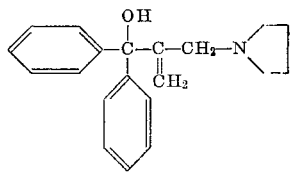

M.P. 100–104° C., obtained from the ethereal solution. Dissolving the base in ethyl acetate and treating the solution with ethanolic hydrochloric acid yields 1,1-diphenyl-2-(pyrrolidinomethyl)-2-propen-1-ol hydrochloride of melting point 198–201° C.

The N-(2-bromallyl)-pyrrolidine used as starting material is obtained by a procedure analogous to that of Example 1 from pyrrolidine and 2,3-dibromopropane in benzene. Boiling point 84–88° C. under a pressure of 23 mm. of Hg.

EXAMPLE 6

Hard gelatine capsules containing 30 mg. of 1,1-diphenyl-2-(dimethylaminomethyl)-2-propen - 1 - ol hydrochloride can be prepared, for example, from the following ingredients:

| | Per capsule, mg. |
|---|---|
| 1,1 - diphenyl - 2 - (dimethylaminomethyl) - 2-propen-1-ol hydrochloride | 30.0 |
| Lactose | 74.5 |
| Talc | 5.0 |
| Colloidal silicic acid | 0.5 |
| | 110.0 |

Preparation

The 1,1-diphenyl-2-(dimethylaminomethyl)-2-propen-1-ol hydrochloride is homogeneously mixed with the lactose, talc and colloidal silicic acid and the mixture filled into hard gelatine capsules No. 4 by means of a suitable filling and sealing apparatus. An average of 110 mg. is filled into each capsule.

In an analogous manner, capsules containing 30 mg. of 1,1 - diphenyl - 2 - (pyrrolidinomethyl) - 2 - propen -1 - ol hydrochloride or 1,1-di-(para-methoxyphenyl)-2-(dimethylaminomethyl)-2-propen-1-ol can be prepared.

EXAMPLE 7

20 g. of 1,1-diphenyl-2-(dimethylaminomethyl)-2-propen-1-ol are heated for 5 hours at 120° C. in 75 ml. of acetic anhydride and 50 ml. of pyridine. The batch is then evaporated under vacuum, the residue mixed with 100 ml. of water and 100 ml. of saturated sodium bicarbonate solution while being cooled with ice, and the whole is agitated twice with ether. The ethereal extract is washed with water, dried and evaporated. The residue is dissolved in 75 ml. of ethyl acetate, and mixed with about 15 ml. of 2.5 N-alcoholic hydrochloric acid until an acid reaction is achieved, whereupon on further addition of ethyl acetate spontaneous crystallization sets in. The isolated 1,1 - diphenyl - 1 - acetoxy - 2 - (dimethylaminomethyl)-2-propene hydrochloride of the formula

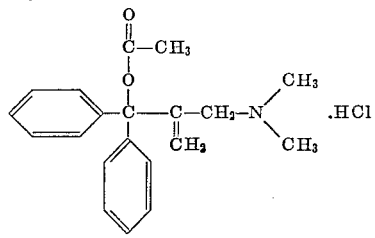

melts at 210 to 212° C. and is readily soluble in water.

EXAMPLE 8

A mixture of 25 g. of 1,1-diphenyl-2-(dimethylaminomethyl)-2-propen-1-ol, 100 ml. of propionic acid anhydride and 25 ml. of pyridine is heated for 5 hours at 70° C., then evaporated to dryness under vacuum, the residue is taken up in ether and sodium bicarbonate solution (200 ml.) while being cooled with ice, the ether is washed with water and from it a residue is solated which is purified by being dissolved in hexane and poured over a column of 460 g. of alumina (neutral). Elution with a 1:1-mixture of hexane+benzene furnishes the desired 1,1-diphenyl - 1 - propionyloxy - 2 - (dimethylaminomethyl) - 2-propene of the formula

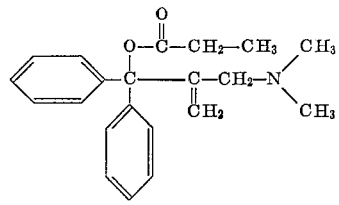

whereas by-products and possible residues of starting material are retained by the column.

Analysis.—Calculated for $O_{21}H_{25}O_2N$: C, 77.98; H, 7.79; N, 4.33%. Found: C, 77.9; H, 7.5; N, 4.1%.

EXAMPLE 9

A solution of 18.0 g. of 1,1-di-(para-methoxyphenyl)-2-(dimethylaminomethyl)-2-propen-1-ol in 100 ml. of propionic acid anhydride and 25 ml. of pyridine is heated on a waterbath for 5 hours at 50° C. The batch is evaporated under vacuum, the residue is mixed with 100 ml. of water and 100 ml. of saturated sodium bicarbonate solution while being cooled with ice, and the whole is extracted twice with ether. The ethereal solution is washed with water, dried and evaporated. The residue is dissolved in 25 ml. of ethyl acetate and about 19 ml. of 2.4 N-alcoholic hydrochloric acid are added to produce an acid reaction, whereupon after further addition of ethyl acetate and ether crystallization sets in gradually. The isolated 1,1-di-(para-methoxyphenyl)-1-propionyloxy-2-(dimethylaminomethyl)-2-propene hydrochloride of the formula

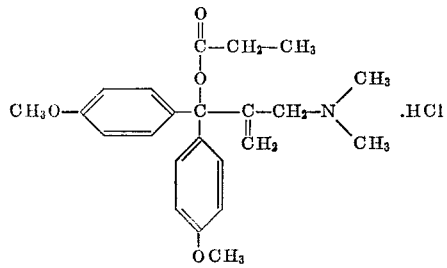

melts at 138 to 141° C.

EXAMPLE 10

A mixture of 18.0 g. of 1,1-di-(para-methoxyphenyl)-2-(dimethylaminomethyl)-2-propen-1-ol, 100 ml. of acetic anhydride and 25 ml. of pyridine is heated for 5 hours at 50° C., then evaporated under vacuum. The residue is mixed with 100 ml. of water and 100 ml. of saturated sodium bicarbonate solution while being cooled with ice, and extracted twice with ether. The ethereal solution is washed with water, dried and evaporated. The residue is dissolved in 75 ml. of ethyl acetate and about 13 ml. of 2.5 N-alcoholic hydrochloric acid are added until an acid reaction has been established, whereupon crystallization sets in immediately when more ethyl acetate is added. The isolated 1,1-di-(para-methoxyphenyl)-1-acetoxy-2-(dimethylaminomethyl)-2-propene hydrochloride of the formula

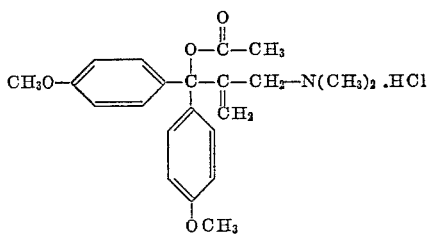

melts at 169 to 171° C.

EXAMPLE 11

19.0 g. of 1-phenyl-1-(meta-chlorophenyl)-2-(dimethylaminomethyl)-2-propen-1-ol are heated at 80° C. for 5 hours with 100 ml. of acetic anhydride and 50 ml. of pyridine. The batch is evaporated under reduced pressure, the residue dissolved in 100 ml. of water and 100 ml. of saturated sodium bicarbonate, and ether, the ethereal solution is washed once with sodium bicarbonate solution and twice with water. The product obtained on evaporation of the ether is dissolved in 100 ml. of ethyl acetate and converted with 25 ml. of 2.5 N-ethanolic hydrochloric acid into the 1-phenyl-1-(meta-chlorophenyl)-1-acetoxy-2-(dimethylaminomethyl)-2-propene hydrochloride of the formula

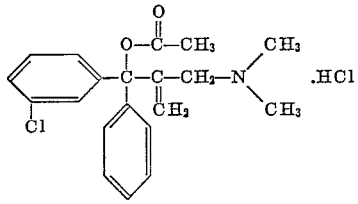

which crystallizes slowly and which is advantageously obtained in crystalline form (M.P. 192–196° C.) by repeated dissolution in ethyl acetate and precipitation with ether.

EXAMPLE 12

19.0 g. of 1-phenyl-1-(meta-chlorophenyl)-2-(dimethylaminomethyl)-2-propen-1-ol are heated at 80° C. for 5 hours with 100 ml. of propionic anhydride and 50 ml. of pyridine. The batch is evaporated under vacuum, the residue dissolved in 100 ml. of water and 100 ml. of saturated sodium bicarbonate, and ether. The ethereal solution is washed once with sodium bicarbonate solution and twice with water. The product obtained on evaporation of the ether is dissolved in 100 ml. of ethyl acetate, treated with 25 ml. of 2.5 N-ethanolic hydrochloric acid, and precipitated with 500 ml. of ether. The resulting product is purified by repeated dissolution in ethyl acetate and precipitation with ether. There is obtained 1-phenyl-1 - (meta - chlorophenyl) - 1 - propionyloxy - 2 - (dimethylaminomethyl)-2-propene hydrochloride of the formula

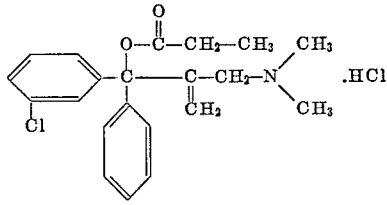

EXAMPLE 13

20 g. of 1,1-diphenyl-2-(pyrrolidinomethyl)-2-propen-1-ol are heated at 100° C. for 5 hours in 100 ml. of acetic anhydride. The acylating agent is evaporated under reduced pressure, the residue dissolved in 100 ml. of ethyl acetate and the solution treated with 14 ml. of ethanolic 2.5 N-hydrochloric acid until an acid reaction is achieved. The batch is evaporated under vacuum, the residue dissolved in 25 ml. of ethyl acetate, followed by precipitation with 300 ml. of ether. The supernatant solution is decanted, and the residue dissolved in 25 ml. of ethyl acetate, followed by precipitation with 300 ml. of ether. There is obtained 1,1-diphenyl-1-acetoxy-2-(pyrrolidinomethyl)-2-propene hydrochloride of the formula

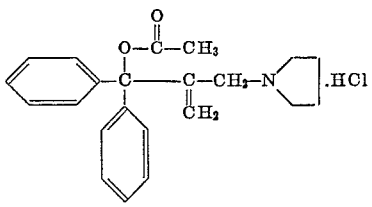

EXAMPLE 14

Tablets containing 30 mg. of 1,1-diphenyl-1-acetoxy-2-(dimethylaminomethyl)-2-propene hydrochloride can be prepared from the following ingredients:

| | Per tablet, mg. |
|---|---|
| 1,1 - diphenyl-1-acetoxy-2-(dimethylaminomethyl)-2-propene hydrochloride | 30.0 |
| Colloidal silicic acid | 3.0 |
| Lactose | 20.0 |
| Wheat starch | 10.0 |
| Cellulose powder | 20.0 |
| Arrowroot | 10.0 |
| Talc | 6.0 |
| Magnesium stearate | 1.0 |
| | 100.0 |

Preparation

The mixture of 1,1-diphenyl-1-acetoxy-2-(dimethylaminomethyl)-2-propene hydrochloride, lactose, wheat starch and cellulose powder is well moistened with ethyl alcohol. The colloidal silicic acid is then added in small portions, and the whole kneaded until a plastic mass is obtained. The latter is forced through a sieve having a mesh width of 4–5 mm., then dried at 45° C. The dry granulate is forced through a sieve having a mesh width of 0.8–1.0 mm., then mixed homogeneously with disintegrating and lubricating agents. The mixture is compressed in the usual manner into tablets having a diameter of 6 mm. and a gross weight of 100 mg.

What is claimed is:

1. A member selected from the group consisting of compounds of the formula

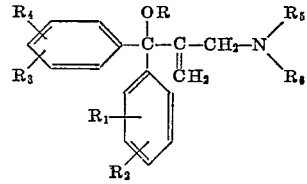

in which R stands for a member selected from the group consisting of lower alkanoyl and carbolower alkoxy, $R_1$, $R_2$, $R_3$ and $R_4$ each stands for a member selected from the group consisting of hydrogen, lower alkyl, lower alkoxy, halogen and trifluoromethyl, and $R_5$ and $R_6$ each stands for a member selected from the group consisting of lower alkyl, and, when taken together with the nitrogen atom, pyrrolidino, piperidino, morpholino and N-lower alkyl piperazino, and their acid addition salts, each of said lower alkyl and lower alkoxy groups having 1 to 4 carbon atoms.

2. A product as claimed in claim 1, in which $R_1$, $R_2$ and $R_3$ stand for hydrogen, R stands for lower alkanoyl, $R_4$ for a member selected from the group consisting of lower alkyl, lower alkoxy, halogen and trifluoromethyl, and

for a member selected from the group consisting of di-lower alkylamino, pyrrolidino, piperidino, morpholino and N-lower alkyl-piperazino, each of said lower alkyl and lower alkoxy groups having 1 to 4 carbon atoms.

3. A product as claimed in claim 1, in which $R_1$, $R_2$, $R_3$ and $R_4$ each stands for hydrogen, R stands for lower alkanoyl and

for a member selected from the group consisting of di-lower alkylamino, pyrrolidino, piperidino, morpholino and N-lower alkyl-piperazino, each of said lower alkyl and lower alkoxy groups having 1 to 4 carbon atoms.

4. A product as claimed in claim 1, wherein $R_1$, $R_2$, $R_3$ and $R_4$ stand for hydrogen,

for pyrrolidino and R for propionyl.

5. A product as claimed in claim 1, in which $R_1$, $R_2$, $R_3$ and $R_4$ stand for hydrogen, $R_5$ and $R_6$ for methyl and R for acetyl.

6. A product as claimed in claim 1, in which $R_1$ $R_2$, $R_3$ and $R_4$ stand for hydrogen, $R_5$ and $R_6$ for methyl and R for propionyl.

7. A product as claimed in claim 1, wherein $R_1$ and $R_3$ stand for hydrogen, $R_2$ and $R_4$ for para-methoxy, $R_5$ and $R_6$ for methyl and R for acetyl.

8. A product as claimed in claim 1, wherein $R_1$, $R_2$ and $R_3$ stand for hydrogen, $R_4$ for meta-chloro, $R_5$ and $R_6$ for methyl and R for acetyl.

9. A product as claimed in claim 1, wherein $R_1$, $R_2$, $R_3$ and $R_4$ stand for hydrogen,

for pyrrolidino and R for acetyl.

10. A product as claimed in claim 1, wherein $R_1$ and $R_3$ stand for hydrogen, $R_2$ and $R_4$ for para-methoxy, $R_5$ and $R_6$ for methyl and R for propionyl.

11. A product as claimed in claim 1, wherein $R_1$, $R_2$ and $R_3$ stand for hydrogen, $R_4$ for meta-chloro, $R_5$ and $R_6$ for methyl and R for propionyl.

No references cited.

ALEX MAZEL, Primary Examiner

JOSE TOVAR, Assistant Examiner

U.S. Cl. X.R.

260—247.2, 247.7, 268, 294, 294.3 294.7, 326.5, 463, 490, 570; 424—248, 250, 267, 274, 301, 311